United States Patent
Nagarajan (10) Patent No.: US 8,275,748 B2
(45) Date of Patent: Sep. 25, 2012

(54) SEMANTIC DATA MIGRATION

(75) Inventor: Sundaresan Nagarajan, Chennai (IN)

(73) Assignee: EMC Corporation, Hopkinton, MA (US)

( * ) Notice: Subject to any disclaimer, the term of this patent is extended or adjusted under 35 U.S.C. 154(b) by 557 days.

(21) Appl. No.: 12/268,328

(22) Filed: Nov. 10, 2008

(65) Prior Publication Data

US 2010/0082543 A1    Apr. 1, 2010

(51) Int. Cl.
*G06F 7/00* (2006.01)
*G06F 17/00* (2006.01)

(52) U.S. Cl. .................. 707/652; 707/618; 707/674

(58) Field of Classification Search .................. 707/618, 707/652, 674
See application file for complete search history.

(56) References Cited

U.S. PATENT DOCUMENTS

| | | | |
|---|---|---|---|
| 6,571,258 B1 * | 5/2003 | Borowsky et al. .................. 1/1 |
| 7,080,221 B1 * | 7/2006 | Todd et al. .................. 711/161 |
| 7,219,092 B2 * | 5/2007 | Ikegaya et al. .................. 1/1 |
| 2003/0093439 A1 * | 5/2003 | Mogi et al. .................. 707/200 |
| 2008/0201542 A1 * | 8/2008 | Maruyama et al. .......... 711/165 |

* cited by examiner

*Primary Examiner* — Cam Truong
(74) *Attorney, Agent, or Firm* — Krishnendu Gupta; Gerald P. Kazanjian (57) ABSTRACT

Migrating data within a storage area network is disclosed. A migration plan is created, the migration plan to move data stored in the storage area network, wherein each element of data is to be moved from a source location to a destination location according to a mapping therebetween. A virtual identifier is assigned to each mapping according to the migration plan. The migration plan is executed. Upon completion of the movement of an element of data, the virtual identifier for the mapping of that element of data is assigned to a resultant location to which that element of data is moved. Upon completion of the execution of the migration plan, the movement of the data is verified by comparing, for each element of data, the virtual identifier of the mapping and the virtual identifier of the resultant location.

20 Claims, 5 Drawing Sheets

SEMANTIC DATA MIGRATION

CROSS REFERENCE TO RELATED APPLICATIONS

The present application claims the benefit of International Patent Application No. PCT/US2008/078344, filed on Sep. 30, 2008, which is incorporated herein by reference in its entirety.

BACKGROUND

The rapid expansion of information service and data processing industries has resulted in a need for computer systems to manage and store large amounts of data. As an example, financial service industry businesses such as banks, mutual fund companies or the like often operate large and complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems that operate as servers to access data stored in the data storage systems.

Elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

A developer or administrator of such a storage area network environment may install one or more distributed storage area network management software applications within the storage area network to manage or administer the various elements (i.e., devices, computer systems, storage systems, etc.) that operate within the storage area network. A network manager (i.e., a user) responsible for management of the storage area network operates the network management software application to perform management tasks such as performance monitoring, network analysis and remote configuration and administration of the various components operating within the storage area network.

A typical conventional storage area network management software application may have several different software components that execute independently of each other on different computer systems but that collectively interoperate together to perform network management. As an example, conventional designs of storage area network management applications can include console, server, agent and storage software components.

Generally, the server component operates as a central control process within the storage area network management application and coordinates communication between the console, storage and agent components. The console component often executes within a dedicated storage area network management workstation to allow the network administrator to visualize and remotely control and manage the various elements within the storage area network that are graphically represented within the console. Certain console applications include Graphical User Interface (GUI) software programs that enable network managers to graphically manage, control and configure various types of hardware and software resources or managed entities associated with a corresponding managed network. In one conventional storage area network management application, rendering the graphical user interface enables the network manager to graphically select, interact with, and manage local or remote devices and associated software processes operating in the network. More specifically, based on use of the graphical user interface in combination with an input device such as a hand operated keyboard and/or mouse and corresponding pointer displayed on a viewing screen, a network manager is able to manage hardware and software entities such as storage devices, peripherals, network data communications devices, and so forth associated with the network. Typically, in such network management applications, a network manager may select a displayed icon representing a corresponding resource in the storage area network and apply a management command in order to display corresponding management information.

Enterprise Storage Networks are large and complex environments that include various elements such as storage arrays, switches, hosts and databases all inter-networked. These elements occur in several hundreds in such environments. These elements in turn may consist of several hundred thousands of manageable elements such as storage devices, storage and switch ports, database instances, host devices and file systems, and the like. Management of such environments is a daunting task and typically requires Storage Resource Management solutions such as EMC's Control Center (ECC) family of products, available from EMC Corporation of Hopkinton, Mass. ECC includes agents that are deployed on storage elements for the purpose of gathering data about these elements, components that process and persist data, applications that use persisted information to enable the management of these environments. ECC identifies the entire process of retrieving the collected data from agents to data persistence as a transaction.

SUMMARY

Conventional methods of data migration suffer from a variety of deficiencies. Namely, especially as a network environment becomes more complex, the costs associated with data migration—computing resources, time, and so on—increase substantially. In a typical large-scale storage area network, there are hundreds, if not thousands, of components, all inter-connected in a variety of ways. To move (i.e., migrate) a single element of data across such a network environment is a non-trivial operation. To migrate large amounts of data is even more complex. The various elements of data must be tracked throughout the process, in case the migration of any portion of the data later needs to be undone.

Embodiments disclosed below overcome these and other issues by providing for a semantic data migration process incorporating various schema driven solutions. The semantic data migration process includes a migration manager that leverages the existing capabilities of Control Center, a leading storage resource management product. The semantic data migration process covers the three major phases of data migration: planning, execution and verification. It implements all these phases in a multi-stage way and it supports midway correction and rollback features. Embodiments of the semantic data migration process described herein are based on identifying the elements of a storage area network environment such as devices, hosts, file systems, databases, arrays, and the like. The details of these elements (or objects) are captured in a repository, such as the Control Center repository. The relational state of an object is defined as the other objects related to the object. This relational state may be defined in terms of the object's subcomponents and attributes, those objects it refers to, and other objects referring to it. The span of the state is limited by the objects supported in the repository. This definition of the relational state of the object forms the basis of the semantic data migration process. It captures the integrity of the configuration of a storage area network and the objects representing the data contained therein. It provides a framework for tracking the relation between objects during the course of data migration.

More particularly, in an embodiment there is provided a method of migrating data within a storage area network. The method includes creating a migration plan, the migration plan to move data stored in the storage area network, wherein each element of data is to be moved from a source location to a destination location according to a mapping therebetween; assigning a virtual identifier to each mapping according to the migration plan; executing the migration plan, wherein upon completion of the movement of an element of data, the virtual identifier for the mapping of that element of data is assigned to a resultant location to which that element of data is moved; and verifying, upon completion of the execution of the migration plan, the movement of the data by comparing, for each element of data, the virtual identifier of the mapping and the virtual identifier of the resultant location.

In a related embodiment, creating may include receiving a selection of the data to be moved within the storage area network; identifying operations required to perform the movement of each element of the selected data, wherein the operations required to move a particular element of the selected data are grouped as a task; and creating an operational order for all operations within each task and all tasks. In a further related embodiment, identifying may include identifying operations required to perform the movement of the selected data by accessing a relational mapping of the storage area network and its components stored within a repository.

In another related embodiment, the method may include tracking movement of data during the execution of the migration plan by referring to the virtual identifiers associated with data being moved; and storing the tracked movement in a track record. In a further related embodiment, the method may include detecting an error during execution of the migration plan; halting execution of the migration plan; undoing any actions that resulted in the error by consulting the track record; refining the migration plan to avoid the detected error; and resuming execution of the migration plan as refined. In a further related embodiment, detecting may include detecting an error during execution of the migration plan, wherein the error includes movement of an element of data to a location that is not the destination location for that element of data; and undoing may include undoing any actions that resulted in the error by consulting the track record and identifying differences between the destination location for an element of data and the resultant location for that element of data by examining the related virtual identifiers.

In still another related embodiment, creating and assigning may be performed through use of a migration and task schema, executing may be performed through use of an operational schema, and verifying may be performed through use of a verification schema.

In another embodiment, there is provided a computer system including a memory, a processor, a display, and an interconnection mechanism coupling the memory, the processor and the display allowing communication there between. The memory of the computer system is encoded with a semantic data migration application, that when executed in the processor, provides a semantic data migration process that migrates data within a storage area network by causing the computer system to perform operations of: creating a migration plan, the migration plan to move data stored in the storage area network, wherein each element of data is to be moved from a source location to a destination location according to a mapping therebetween; assigning a virtual identifier to each mapping according to the migration plan; executing the migration plan, wherein upon completion of the movement of an element of data, the virtual identifier for the mapping of that element of data is assigned to a resultant location to which that element of data is moved; and verifying, upon completion of the execution of the migration plan, the movement of the data by comparing, for each element of data, the virtual identifier of the mapping and the virtual identifier of the resultant location.

In yet another embodiment, there is provided a computer program product, stored on computer readable medium, to migrate data within a storage area network. The computer program product includes computer program code for: creating a migration plan, the migration plan to move data stored in the storage area network, wherein each element of data is to be moved from a source location to a destination location according to a mapping therebetween; assigning a virtual identifier to each mapping according to the migration plan; executing the migration plan, wherein upon completion of the movement of an element of data, the virtual identifier for the mapping of that element of data is assigned to a resultant location to which that element of data is moved; and verifying, upon completion of the execution of the migration plan, the movement of the data by comparing, for each element of data, the virtual identifier of the mapping and the virtual identifier of the resultant location.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by EMC, Inc., of Hopkinton, Mass.

Note that each of the different features, techniques, configurations, etc. discussed in this disclosure may be executed independently or in combination. Accordingly, the present invention may be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Generally, embodiments disclosed and described herein provide for semantic data migration within a storage area network (SAN), though the principles described herein may be applied to any type of network. As used throughout, a session may be a migration session involving selected elements of the SAN; a schema may be a relational schema which is a subset of the Control Center (CC) repository that is custom-created based on the specific actions it is modeling like a migration activity; a task may be an individual homogeneous operations within a migration session; and SANRefresh may refer to the operation of a new discovery of a SAN and populating the details in the CC repository.

Figure 1:
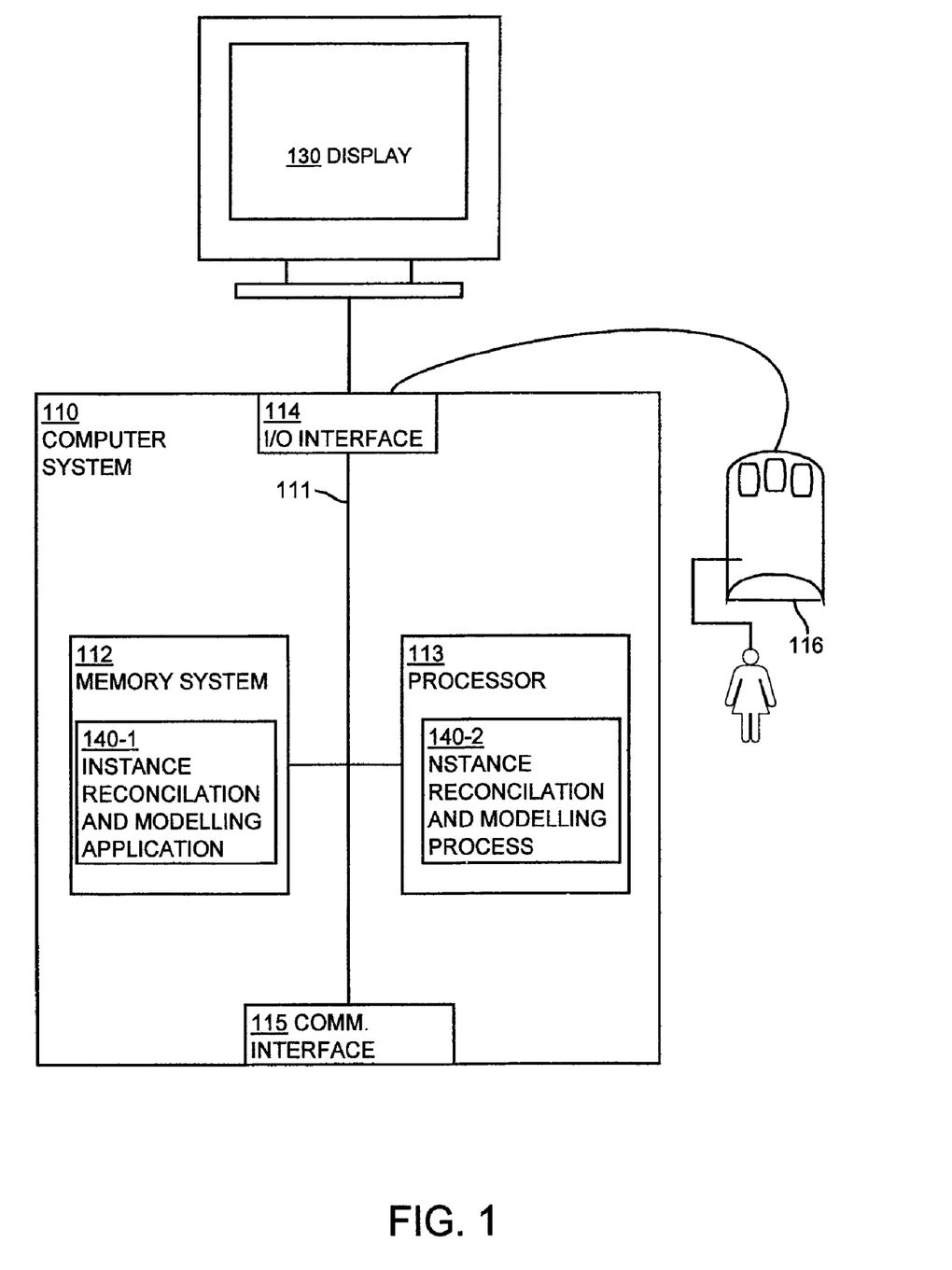
FIG. 1 shows a high-level block diagram of a computer system according to one embodiment disclosed herein.

More particularly, FIG. 1 is a block diagram illustrating example architecture of a computer system 110 that executes, runs, interprets, operates or otherwise performs a semantic data migration application 140-1 and a semantic data migration process 140-2, suitable for use in explaining example configurations disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, touchpad, trackball, etc.) couples to the processor 113 through the I/O interface 114 and enables a user 108 such as a system administrator of a network 135 to provide input commands and generally administer the network 135 through, for example, a graphical user interface that may be provided on a display 130. The communications interface 115 enables the computer system 110 to communicate with other devices on the network 135.

The memory system 112 is any type of computer readable medium and in this example is encoded with a semantic data migration application 140-1 that includes semantic data migration process 140-2. The semantic data migration application 140-1 may be embodied as software code such as data and/or logic instructions (e.g., code stored in the memory system 112 or on another computer readable medium such as a removable disk) that supports processing functionality according to different embodiments described herein. During operation of the computer system 110, the processor 113 accesses the memory system 112 via the interconnection mechanism 111 in order to launch, run, execute, interpret or otherwise perform the logic instructions of the semantic data migration application 140-1. Execution of the semantic data migration application 140-1 in this manner produces processing functionality in a semantic data migration process 140-2. In other words, the semantic data migration process 140-2 represents one or more portions or runtime instances of the semantic data migration application 140-1 performing or executing within or upon the processor 113 in the computer system 110 at runtime.

It is noted that example configurations disclosed herein include the semantic data migration application 140-1 itself including the semantic data migration process 140-2 (i.e., in the form of un-executed or non-performing logic instructions and/or data). The semantic data migration application 140-1 may be stored on a computer readable medium (such as a floppy disk), hard disk, electronic, magnetic, optical or other computer readable medium. The semantic data migration application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the semantic data migration application 140-1 in the processor 113 as the semantic data migration process 140-2. Those skilled in the art will understand that the computer system 110 may include other processes and/or software and hardware components, such as an operating system not shown in this example.

Figure 2:
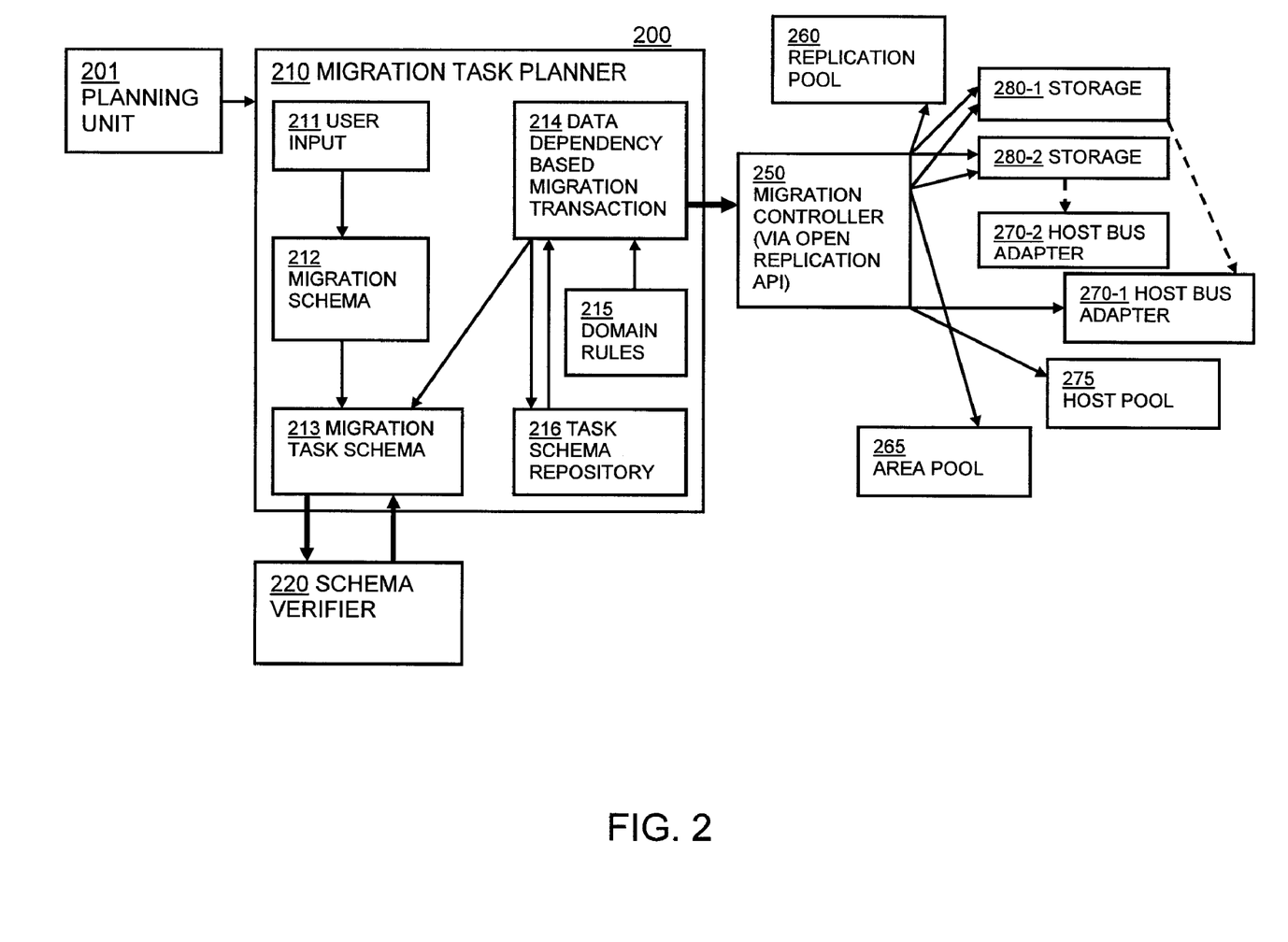
FIG. 2 illustrates an example of a system that performs semantic data migration according to embodiments described herein.
Figure 3:
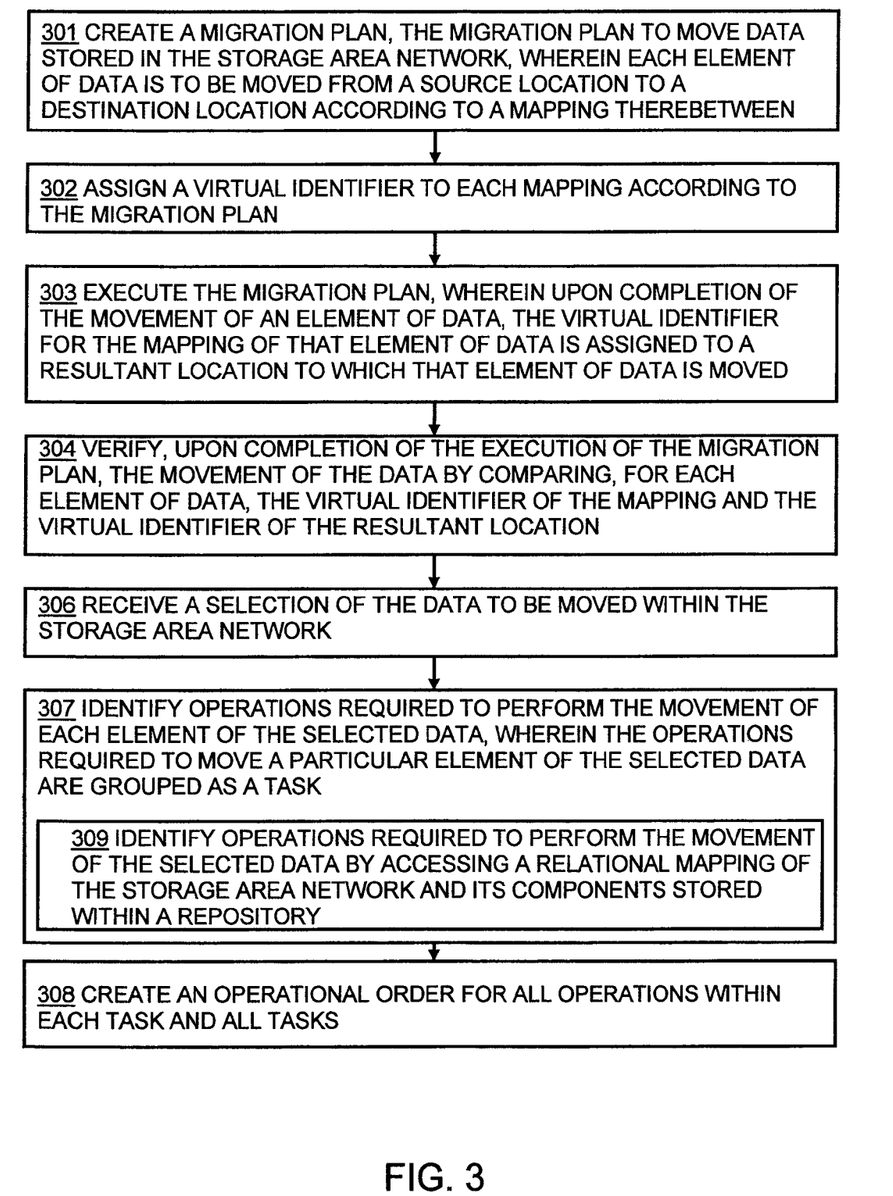
FIG. 3 illustrates a flowchart of a procedure performed by the system of FIG. 1 when performing semantic data migration.
Figure 4:
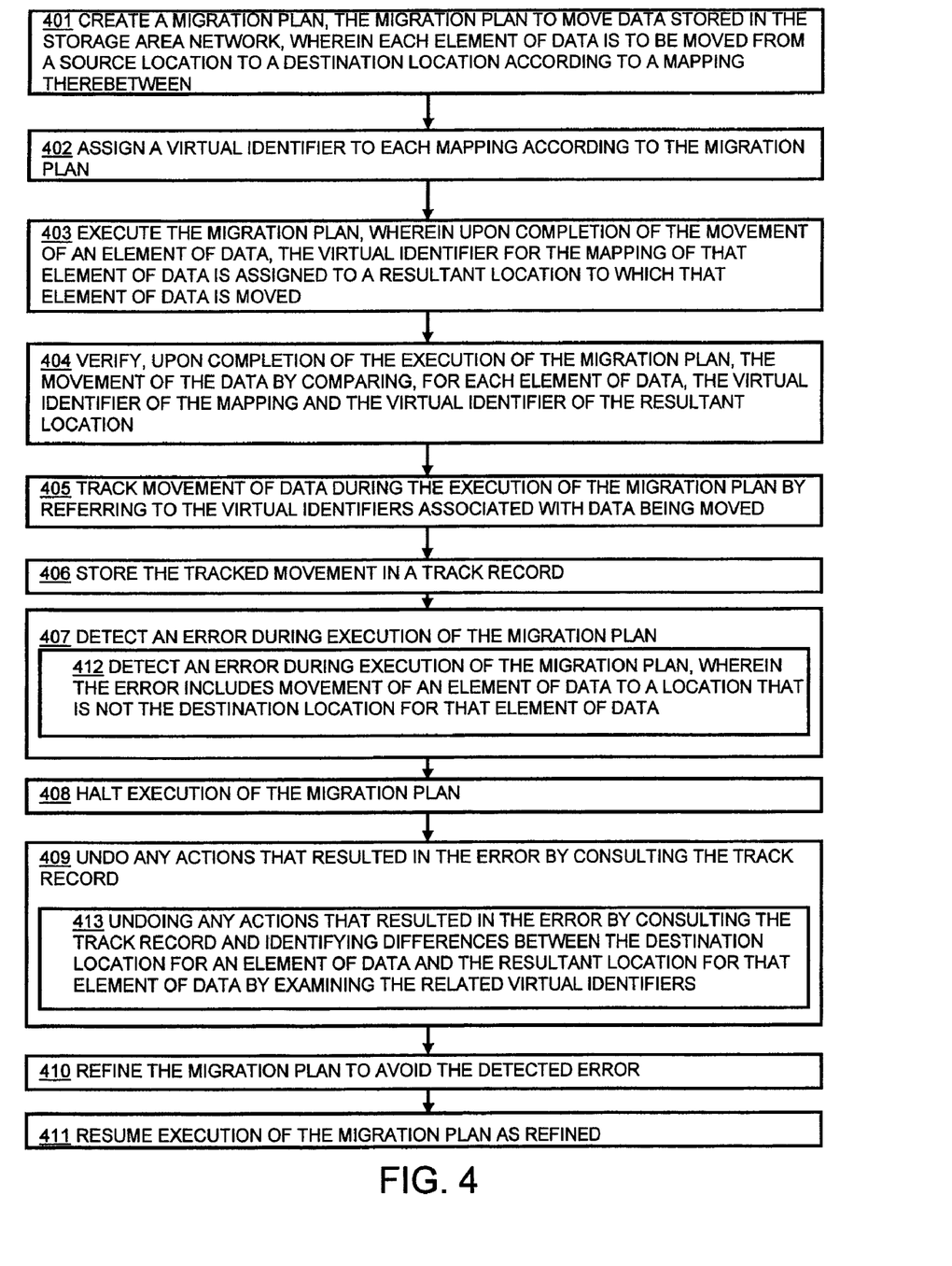
FIG. 4 illustrates a flowchart of a procedure performed by the system of FIG. 1 when performing semantic data migration involving tracking of data being moved.
Figure 5:
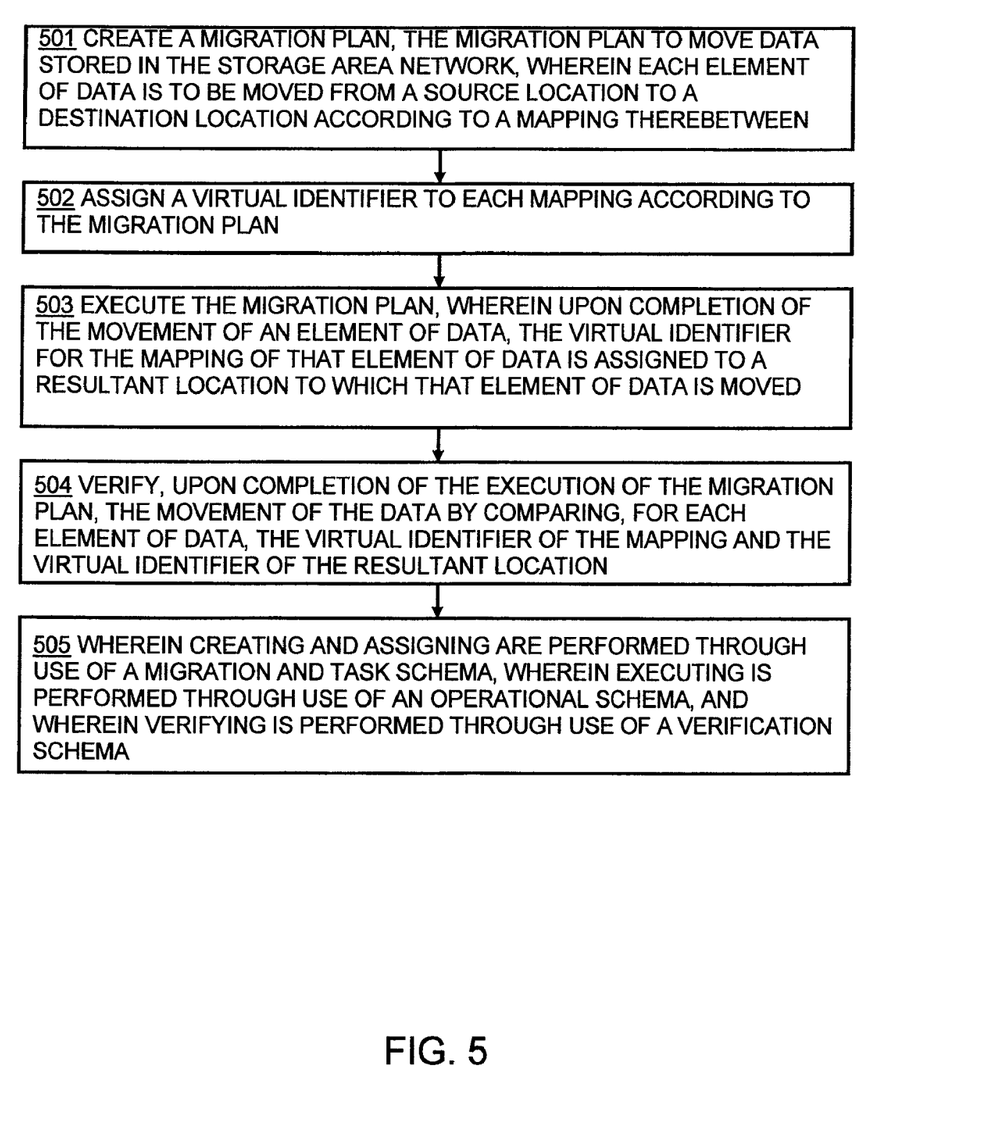
FIG. 5 illustrates a flowchart of a procedure performed by the system of FIG. 1 when performing semantic data migration using schema.

FIG. 2 represents an example system which performs semantic data migration according to embodiments described herein. The computer system 110 shown in FIG. 1 may be a part of the system of FIG. 2 or may be a separate entity connected to the system of FIG. 2. Flow diagrams of particular embodiments are depicted in FIGS. 3-5. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

In FIGS. 3-5, the semantic data migration process 140-2 described above with regards to FIG. 1 results in the migration of data within a storage area network. The semantic migration process 140-2 includes, in some embodiments, such as a system 200, the following components to deal with the three phases of migration planning, execution and verification: a Migration Task Planner 210, a Migration Controller 250, and a SchemaVerifier 220. The Migration Task Planner 210 helps in planning the migration in terms of simple tasks to be executed. An initial task plan may be received from a planning unit 201, or may otherwise be received as user input 211. From this initial task plan, as described in greater detail below, migration schema 212 and migration task schema 213 develop a task plan. The task plan may be modified according to rules stored within domain rules 215 and according to transactions within data dependency based migration transaction 214. The task plan may then be stored in task schema repository 216 and is also sent to the Schema Verifier 220 and the Migration Controller 250. The Migration Controller 250 executes the tasks received from the Migration Task Planner 210 with the help of application programming interfaces (indicated in FIG. 2 by arrows to storage 280-1, 280-2, and replication pool 260; to storage 280-1, 280-2, and area pool 265; and to host bus adaptor 270-1 and host pool 275) which may, in some embodiments, include an OpenReplication API and other native APIs. The SchemaVerifier 220 tracks the migration execution against the original task plan, as formulated by the Migration Task Planner 210 and communicated from the migration task schema 213, and enables performance of a loop-based multi-staged data migration. The semantic migration process 140-2 makes use of the Control Center (CC) Repository, or other similar repositories of data describing the components of a SAN, for the various schemas it uses. The CC repository may be updated by means of SANRefresh, which does a discovery of the SAN environment.

The semantic migration process 140-2 first creates a migration plan, step 301. The migration plan is to move data stored in the storage area network. Each element of data is to be moved from a source location to a destination location according to a mapping therebetween. In some embodiments, the semantic migration process 140-2 may create a plan by first receiving a selection of the data to be moved within the storage area network, step 306. The semantic migration process 140-2 then identifies operations required to perform the movement of each element of the selected data, wherein the operations required to move a particular element of the selected data are grouped as a task, step 307, and creates an operational order for all operations within each task and all tasks, step 308. In some embodiments, the semantic migration process 140-2 identifies operations required to perform the movement of the selected data by accessing a relational mapping of the storage area network and its components stored within a repository, step 309.

The semantic migration process 140-2 then assigns a virtual identifier to each mapping according to the migration plan, step 302. Next, the semantic migration process 140-2 executes the migration plan, step 303. Upon completion of the movement of an element of data, the virtual identifier for the mapping of that element of data is assigned to a resultant location to which that element of data is moved. Finally, the semantic migration process 140-2 verifies, upon completion of the execution of the migration plan, the movement of the data by comparing, for each element of data, the virtual identifier of the mapping and the virtual identifier of the resultant location, step 304.

In some embodiments, the semantic migration process 140-2 may track movement of data during the execution of the migration plan by referring to the virtual identifiers associated with data being moved, step 405; and stores the tracked movement in a track record, step 406. The semantic migration process 140-2 may then detect an error during execution of the migration plan, step 407. An error may be, but is not limited to, an element of data being moved to an incorrect location, or a destination location being unavailable due to a change in the physical structure of the SAN and/or the failure of the component of the SAN including the destination location. The semantic migration process 140-2 then halts execution of the migration plan, step 408. The semantic migration process 140-2 may undo any actions that resulted in the error by consulting the track record, step 409, and then refines the migration plan to avoid the detected error, step 410. The refinements may be automatically determined by the semantic migration process 140-2, may be based upon user input, or may be a combination of both. Finally, the semantic migration process 140-2 resumes execution of the migration plan as refined, step 411.

In some embodiments, the semantic migration process 140-2 detects an error during execution of the migration plan, wherein the error includes movement of an element of data to a location that is not the destination location for that element of data, step 412, and then undoes any actions that resulted in the error by consulting the track record and identifying differences between the destination location for an element of data and the resultant location for that element of data by examining the related virtual identifier, step 413.

Thus, a user selects a mapping between source storage and destination storage at the higher level. Based on user input selection, the migration session is configured. Each migration session has a migration schema based on the relational attributes of the selection from Control Center Repository latest discovery snapshot. The migration schema is a subset of CC Repository. Selection is now performed based on lower level objects like individual devices, port interfaces within the migration session. At this step of the migration session we create what is know as a well defined task. The task is part of the session. There can be multiple independent tasks within a session.

Note that, in some embodiments, creating and assigning are performed through use of a migration and task schema, wherein executing is performed through use of an operational schema, and wherein verifying is performed through use of a verification schema, step 505. The migration schema may be considered as the way of capturing the state of the migration environment. Based on which we can derive the next state of how the environment will look after the migration operation. Task Planner will show the differences of the tasks performed and the expected state. The actions whether it is performed by semantic migration process 140-2 or other tools is always tracked with the expected state. Of course a user may do a change of expected state by reconfiguration, SANRefresh and initiating a new session. All the tasks executed for a session can be stored in a task repository. The migration schema and task schema can be stored in the form of snapshots.

Again the user selects the individual objects. The task planner collects the state information associated with the selected object through a relational search of the migration schema and creates the migration task and its associated task schema. Each migration session has tasks within it. Each of them has their schemas. The task may be considered as a transaction, which means all the operations are logically related to an object. Many such tasks exist. These tasks are independent of each other but belong to the same migration session.

To create the execution plan, the planner makes use of the migration transaction scheduler. It takes care of two factors: the order in which the operations in a transaction are executed, and identifies operations that may be executed in parallel with a task and across tasks in a migration session. Thus, the transaction scheduler may be said to use task domain rules and optimizations based on parameters like replication type and contiguity.

In execution planning for migration, there are some other factors that are taken into account. When the plan is implemented based on the schema, two cases arise may arise: capabilities to implement that part of the plan, (an exception could be a hardware or a wiring change), and the decision of the user to enforce that change. Nevertheless, the implementation plan for the data migration session identifies the tasks to be implemented for that success migration. During the migration session the plan of execution can change by the following ways. An operation is performed either through semantic migration process 140-2 or other tools or manual, and a SANRefresh is done. After this the migration operation schema changes. Alternatively, the initial user inputs are changed which results in the creation of a new migration session and schema.

When the task schema for a task is created, there is a special identifiers added known as placeholders for verification. It is based on the user selection mappings. It makes use of virtual identifier assigned in a way the source objects and destination objects can be compared against the actual tasks performed during migration execution. The Virtual IDs are the placeholders for verification, done by the SchemaVerifier. They identify the user mappings. These mappings and the virtual IDs are sent to the migration controller (the abstraction layer) before the execution. Once the task is executed the destination object IDs and the tagged virtual IDs are populated in the operation schema. This forms the basis for the SchemaVerifier component. At the end of this stage, we have a plan that is ready to be executed.

The actual migration execution takes place based on an abstraction layer called the Migration Controller (MC). The role of the MC is to implement the migration execution plan. It should be done in an optimal way by pooling replication connections and keeping track of them; react to user interruptions on migration actions, and support the recording of the migration state in the operation schema based on migration execution and virtual IDs.

The MC performs the following operations: translate the execution plan into specific operations, which may be based on a opcode table that defines the operation codes for the standard set of operation and the parameters that are needed for a specific opcode; interface through an API such as the OpenReplication API and control the connections; and interface with other APIs such as Host Management, Fabric API and Array API for the respective operations depending on the demands of the transaction.

The OpenReplication API is an open and standard set of interfaces for semantic migration process 140-2 to communicate with the various native replication applications. The API can be classified into connection state methods, data structures of replication related data that is to be shared between replicators and controller. The OpenReplication API is a wrapper over the individual replication APIs so that it can support features like session management, connection pooling, virtual IDs.

The methods supported include connection related methods, session methods like start session, terminate session, pause session, resume session, some of which may be user-initiated. The OpenReplication API is a wrapper over the existing APIs for performing replication operations. The wrapper will provide support for things like state details and virtual IDs. Host management, Fabric API and Array API are already supported. A few of the replications are already supported in CC. The native replicators need to support this API interface but it should be relatively easy as they are internal replication solutions.

The SchemaVerifier performs the operation of comparing the schemas based on the virtual identifiers. It is basic use is to give a difference of the dependencies (i.e. the pending actions) for the migration task. This with respect to what is accomplished till now for the given migration task. The SchemaVerifier component may include Operation Schema, which are the latest discovery subset of migration schema updated after the execution of the migration task. The SchemaVerifier works on the basis of comparison of schemas. There are a number of tools available for schema comparison which makes the task simpler. The criteria for comparison in the verifier will depend on parameters such as but not limited to capacity calculation and a comparison mapping of object sets.

Apart from the schema verifier, the verification process may be performed using the host, array APIs and read-only operations. It will be based on the actions captured in the operation schema. Due to the schema driven process, at any stage the data migration can be restarted from midway after doing a SANRefresh. Thus, the SchemaVerifier may be invoked after a SANRefresh and the operation schema is updated. The changes in the SAN environment could be by semantic migration process 140-2, hardware or other means. The SchemaVerifier model can track the changes. This is possible due to the level of detail present in the CC Repository.

The loop-based model is useful for correcting any mistakes or errors; midway correction of mistakes or errors; the rollback of certain actions and allows the migration plan to be changed midway.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method of migrating data within a storage area network, comprising:
creating a migration plan, the migration plan to move data stored in the storage area network, wherein each element of data is to be moved from a source location to a destination location according to a mapping therebetween;
assigning a virtual identifier to each mapping according to the migration plan, each virtual identifier associated with the source location and the destination location according to the mapping of each respective element of data;
executing the migration plan, wherein upon completion of the movement of an element of data, the virtual identifier for the mapping of that element of data is assigned to a resultant location to which that element of data is moved; and
verifying, upon completion of the execution of the migration plan, the movement of the data by comparing, for each element of data, the virtual identifier of the mapping and the virtual identifier of the resultant location.

2. The method of claim 1 wherein creating comprises:
receiving a selection of the data to be moved within the storage area network;
identifying operations required to perform the movement of each element of the selected data, wherein the operations required to move a particular element of the selected data are grouped as a task; and
creating an operational order for all operations within each task and all tasks.

3. The method of claim 2 wherein identifying comprises:
identifying operations required to perform the movement of the selected data by accessing a relational mapping of the storage area network and its components stored within a repository.

4. The method of claim 1 comprising:
tracking movement of data during the execution of the migration plan by referring to the virtual identifiers associated with data being moved; and
storing the tracked movement in a track record.

5. The method of claim 4 comprising:
detecting an error during execution of the migration plan;
halting execution of the migration plan;
undoing any actions that resulted in the error by consulting the track record;
refining the migration plan to avoid the detected error; and
resuming execution of the migration plan as refined.

6. The method of claim 5 wherein detecting comprises:
detecting an error during execution of the migration plan, wherein the error includes movement of an element of data to a location that is not the destination location for that element of data;
and wherein undoing comprises:
undoing any actions that resulted in the error by consulting the track record and identifying differences between the destination location for an element of data and the resultant location for that element of data by examining the related virtual identifiers.

7. The method of claim 1 wherein creating and assigning are performed through use of a migration and task schema, wherein executing is performed through use of an operational schema, and wherein verifying is performed through use of a verification schema.

8. A computer system comprising:
a memory;
a processor;
a display; and
an interconnection mechanism coupling the memory, the processor and the display, allowing communication there between;
wherein the memory of the computer system is encoded with a semantic data migration application, that when executed in the processor, provides a semantic data migration process that migrates data within a storage area network by causing the computer system to perform operations of:

creating a migration plan, the migration plan to move data stored in the storage area network, wherein each element of data is to be moved from a source location to a destination location according to a mapping therebetween;

assigning a virtual identifier to each mapping according to the migration plan, each virtual identifier associated with the source location and the destination location according to the mapping of each respective element of data;

executing the migration plan, wherein upon completion of the movement of an element of data, the virtual identifier for the mapping of that element of data is assigned to a resultant location to which that element of data is moved; and verifying, upon completion of the execution of the migration plan, the movement of the data by comparing, for each element of data, the virtual identifier of the mapping and the virtual identifier of the resultant location.

9. The computer system of claim 8 wherein creating comprises:

receiving a selection of the data to be moved within the storage area network;

identifying operations required to perform the movement of each element of the selected data, wherein the operations required to move a particular element of the selected data are grouped as a task; and creating an operational order for all operations within each task and all tasks.

10. The computer system of claim 8 comprising:

tracking movement of data during the execution of the migration plan by referring to the virtual identifiers associated with data being moved; and storing the tracked movement in a track record.

11. The computer system of claim 10 comprising:

detecting an error during execution of the migration plan;

halting execution of the migration plan;

undoing any actions that resulted in the error by consulting the track record;

refining the migration plan to avoid the detected error; and resuming execution of the migration plan as refined.

12. The computer system of claim 11 wherein detecting comprises:

detecting an error during execution of the migration plan, wherein the error includes movement of an element of data to a location that is not the destination location for that element of data;

and wherein undoing comprises:

undoing any actions that resulted in the error by consulting the track record and identifying differences between the destination location for an element of data and the resultant location for that element of data by examining the related virtual identifiers.

13. The computer system of claim 8 wherein creating and assigning are performed through use of a migration and task schema, wherein executing is performed through use of an operational schema, and wherein verifying is performed through use of a verification schema.

14. A computer program product, stored on a non-transitory computer readable medium, to create a model of a system by reconciling information that describes physical elements of the system as objects in the model, the computer program product comprising computer program code for:

creating a migration plan, the migration plan to move data stored in the storage area network, wherein each element of data is to be moved from a source location to a destination location according to a mapping therebetween;

assigning a virtual identifier to each mapping according to the migration plan, each virtual identifier associated with the source location and the destination location according to the mapping of each respective element of data;

executing the migration plan, wherein upon completion of the movement of an element of data, the virtual identifier for the mapping of that element of data is assigned to a resultant location to which that element of data is moved; and verifying, upon completion of the execution of the migration plan, the movement of the data by comparing, for each element of data, the virtual identifier of the mapping and the virtual identifier of the resultant location.

15. The computer program product of claim 14 wherein creating comprises:

receiving a selection of the data to be moved within the storage area network;

identifying operations required to perform the movement of each element of the selected data, wherein the operations required to move a particular element of the selected data are grouped as a task; and creating an operational order for all operations within each task and all tasks.

16. The computer program product of claim 15 wherein identifying comprises:

identifying operations required to perform the movement of the selected data by accessing a relational mapping of the storage area network and its components stored within a repository.

17. The computer program product of claim 14 comprising:

tracking movement of data during the execution of the migration plan by referring to the virtual identifiers associated with data being moved; and storing the tracked movement in a track record.

18. The computer program product of claim 17 comprising:

detecting an error during execution of the migration plan;

halting execution of the migration plan;

undoing any actions that resulted in the error by consulting the track record;

refining the migration plan to avoid the detected error; and resuming execution of the migration plan as refined.

19. The computer program product of claim 18 wherein detecting comprises:

detecting an error during execution of the migration plan, wherein the error includes movement of an element of data to a location that is not the destination location for that element of data;

and wherein undoing comprises:

undoing any actions that resulted in the error by consulting the track record and identifying differences between the destination location for an element of data and the resultant location for that element of data by examining the related virtual identifiers.

20. The computer program product of claim 14 wherein creating and assigning are performed through use of a migration and task schema, wherein executing is performed through use of an operational schema, and wherein verifying is performed through use of a verification schema.

* * * * *